(12) United States Patent
Aharoni et al.

(10) Patent No.: US 10,169,292 B2
(45) Date of Patent: Jan. 1, 2019

(54) STRING VARIABLES REPRSENTATION IN SOLVERS

(71) Applicant: International Business Machines Corporation, Armonk, NY (US)

(72) Inventors: Merav Aharoni, Kiriat Tivon (IL); Yael Ben-Haim, Haifa (IL); Eyal Bin, Haifa (IL); Odellia Boni, Giva'at Ela (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/582,698

(22) Filed: Apr. 30, 2017

(65) Prior Publication Data
US 2018/0314672 A1   Nov. 1, 2018

(51) Int. Cl.
*G06F 17/11* (2006.01)
(52) U.S. Cl.
CPC .................................... *G06F 17/11* (2013.01)
(58) Field of Classification Search
CPC ...................................................... G06F 17/11
USPC ........................................................ 708/306
See application file for complete search history.

(56) References Cited

U.S. PATENT DOCUMENTS

| | | | |
|---|---|---|---|
| 7,499,764 B2 | 3/2009 | Fukui | |
| 8,572,574 B2 | 10/2013 | Ghosh et al. | |
| 8,972,949 B2 | 3/2015 | Ghosh et al. | |
| 9,021,582 B2 | 4/2015 | Goldman et al. | |
| 2002/0169587 A1* | 11/2002 | Emek | G06F 17/10 703/2 |
| 2012/0130932 A1* | 5/2012 | Veanes | G06F 11/3608 706/46 |

OTHER PUBLICATIONS

He et al., "Solving String Constraints: The Case for Constraint Programming", International Conference on Principles and Practice of Constraint Programming, Lecture Notes in Computer Science, Sep. 16-20, 2013, pp. 381-397, vol. 8124.

(Continued)

*Primary Examiner* — Tan V Mai
(74) *Attorney, Agent, or Firm* — Ziv Glazberg

(57) ABSTRACT

A method and product for solving a Constraint Satisfaction Problem (CSP) having a constraint associated with a string variable, comprising: defining a string variable using a string domain data structure representing a domain of string values for string variables, the structure represents the domain as a Deterministic Finite Automaton (DFA) with no back loops longer than 1 and edges representing characters; defining a constraint for the CSP, wherein the constraint involves the variable and is to be complied with by a solution to the CSP; invoking a CSP solver using the string variable while complying with the constraint, and to invoke operations performed over the domain, wherein the solver: propagates values into the domain of string values, wherein the value propagation reduces the domain size; or selects values from the domain thus reducing the domain to a singleton domain, whereby value propagation to domains of other variables is invoked by the solver.

17 Claims, 9 Drawing Sheets

(56) References Cited

OTHER PUBLICATIONS

Liang et al., "A DPLL(T) Theory Solver for a Theory of Strings and Regular Expressions", International Conference on Computer Aided Verification, Lecture Notes in Computer Science, pp. 646-662, vol. 8559.
Kelsey et al., "The Exact Closest String Problem as a Constraint Satisfaction Problem", Procedia Computer Science 4, 2011, pp. 1062-1071.
Golden et al., "Constraint reasoning over strings", CP 2003, LNCS, vol. 2833, pp. 377-391, 2003.
Monette et al., "A Propagator Design Framework for Constraints over Sequences", AAAI'14 Proceedings of the Twenty-Eighth AAAI Conference on Artificial Intelligence, Jul. 27-31, 2014, pp. 2710-2716.
Maher, "Open Constraints in a Boundable World", LNCS, 2009, pp. 163-177, vol. 5547.
Bhargava et al., "An Experimental Survey on Parsing with Neural and Finite Automata Networks", IJCSI International Journal of Computer Science issues, pp. 279-288, vol. 8, Issue 4, No. 2, Jul. 2011 ISSN (Online): 1694-0814.

\* cited by examiner (ab)|(ac)|(ca*)

(ab)|(ac)|(ca*)

(ab)|(ac)|c|()

$t_1.IsEquivalent(s_1)$

STRING VARIABLES REPRSENTATION IN SOLVERS

TECHNICAL FIELD

The present disclosure relates to constraint satisfaction problem solvers in general, and to string representation for constraint satisfaction problem solvers, in particular.

BACKGROUND

Computerized devices and systems control almost every aspect of our life, both as individuals and as a society. Many of the computerized systems gather or use data about computerized systems, products, processes, individuals, and other entities, and have to solve problems. One type of problems, referred to as Constraint Satisfaction Problems (CSPs), comprises a wide range of problems, relevant to fields such as resource allocation, DNA exploration, databases testing, functional verification, and others.

CSPs may be defined by a multiplicity of variables, each of a particular domain, i.e. a set of possible values, and one or more constraints to be met by the combination of values assigned to the variables. Thus, a set of values for the variables, wherein the value of each variable is selected from the respective domain, is a solution if all constraints are met, wherein each constraint may refer to one or more variables.

For example, a two-variable problem may relate to two integer variables, a between 0 and 4, and b between 1 and 5, and a constraint a+b=3. Thus, out of the 25 possible value combinations, only the combinations of (a=0, b=3), (a=1, b=2) and (a=2, b=1) are valid solutions to the problem.

Exhaustive searching over combinations of all values within the domains of the involved variables, and verifying for each combination whether it complies with the constraints is not only inefficient but also not always feasible, for example in the case of variables having infinite domains.

CSPs may be solved by CSP solvers. CSP solvers often exhibit high complexity, especially when the problems are to be solved within a reasonable time.

CSP solvers typically operate by propagating constraints, i.e., reducing one or more variable domains to a smaller domain, such as but not limited to a singleton domain, which may be based on the constraints and the variable values. The values which are removed from a specific domain during propagation cannot be extended into a satisfying solution or are otherwise invalid. In the example above, given the constraint and the fact that a and b domains contain only non-negative numbers, all numbers which are larger than 3 can be removed from the domains of a and b. Constraint propagation can be followed by selecting values for the variables from the reduced domains. The value combination is then tested to see if it complies with the constraints. If yes, the values may be returned. Otherwise, the solver may backtrack and undo one or more of the selections. The selection and propagation may repeat until a solution is found, or until it is determined that the problem is unsolvable.

Reducing the domains and selecting values may require one or more mathematical or logical operations to be performed on the variables' domains.

Thus, in order to use CSP solvers, each type of variable used in the constraints, such as integer numbers, real numbers, characters, strings, complex types, or others, has to be implemented in a manner that supports the expression of all the values within the domain that can be assigned to the variable, as well as provides for efficient execution of a variety of operations over the domain. Some examples of such operations include the determination of maximum or minimum value, getting the size of the domain, domains' intersection and union (also referred to as join), or others.

Character strings are a specific type of variable that poses significant difficulty for CSP solvers. Some string representations provide flexibility in expressing a wide range of values, but the implementation of some operations over such representations is of high complexity and may not allow a CSP solver to operate efficiently.

BRIEF SUMMARY

One exemplary embodiment of the disclosed subject matter is a method for solving a Constraint Satisfaction Problem (CSP) having a constraint associated with one or more string variables, comprising: defining one or more string variables using a string domain data structure representing a domain of string values for string variables, wherein the string data structure represents the domain of string values as a Deterministic Finite Automaton (DFA), wherein the DFA comprising nodes and edges, wherein the nodes comprise an initial node, also referred to as starting node, and one or more accepting nodes, wherein the DFA has no back loops having size greater than 1, wherein the edges of the DFA represent one or more characters, wherein the domain of string values comprises each string for which a path in the DFA, according to characters in the edges of the path, exists beginning in the initial node and ending in one of the one or more accepting nodes; defining a constraint for the CSP, wherein the constraint involves the at least one variable and wherein the constraint is to be complied with by a solution to the CSP; s invoking a CSP solver adapted to determine a solution to variables including the at least one string variable while complying with the constraint, and to invoke operations performed over the domain of the at least one string variable, wherein the CSP solver is configured to perform at least one of the following: value propagation into the domain of string values, wherein the value propagation reduces a size of the domain; and value selection of a value from the domain of string values, wherein the value selection reduces the domain, whereby value propagation to domains of one or more other variables is invoked by the CSP solver. Within the method, the CSP solver optionally performs operators on one or more of the DFA, wherein each of the operators returns a DFA comprising nodes and edges, wherein the nodes comprise an initial node and one or more accepting nodes, wherein the DFA has no back loops having size greater than 1, and wherein each of the edges represents one or more characters.

Another exemplary embodiment of the disclosed subject matter is a computer program product comprising a non-transitory computer readable storage medium retaining program instructions configured to cause a processor to perform actions, which program instructions implement: a string domain data structure for defining a domain of string values for a string variable, wherein the string data structure represents the domain of string values as a Deterministic Finite Automaton (DFA), wherein the DFA comprising nodes and edges, wherein the nodes comprise an initial node and one or more accepting nodes, wherein the DFA has no back loops having size greater than 1, wherein the edges of the DFA represent one or more characters, wherein the domain of string values comprises each string for which a path in the DFA, according to characters in the edges of the path, exists beginning in the initial node and ending in one of the one or more accepting nodes; operations to be performed over one or more string variables defined in the domain of string values, wherein the operations to be performed include operations useful for solving a Constraint Satisfaction Problem (CSP) which includes a constraint involving a string variable having the domain.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
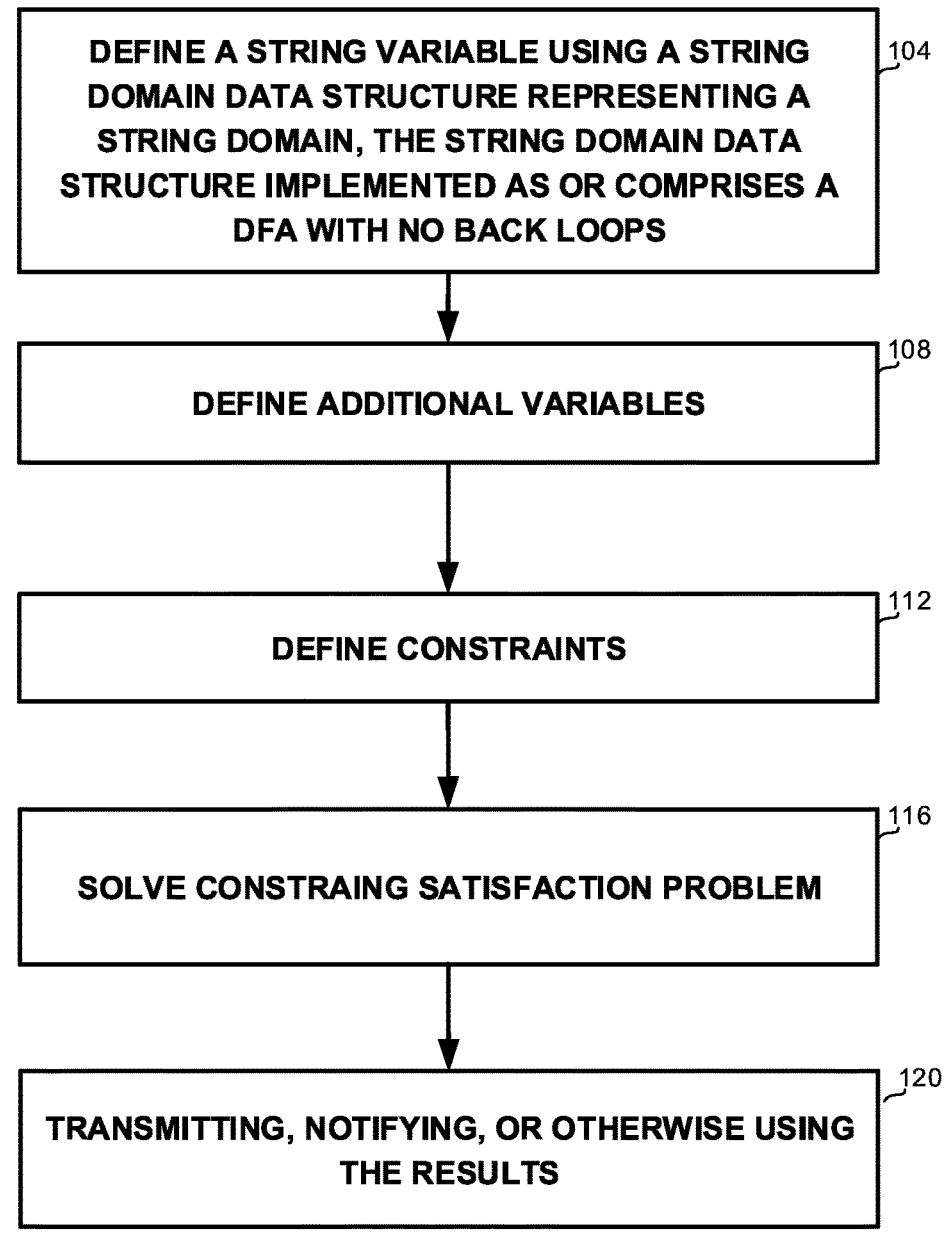
FIG. 1 is a flowchart of a method for using Deterministic Finite Automaton (DFA) representation for solving a CSP, in accordance with some embodiments of the disclosure.

One technical problem dealt with by the disclosed subject matter is the need to represent string domains in a manner that can be efficiently handled by a CSP solver. As for any other domain type used by a CSP solver, handling string variables in real-life problems requires compact domain representation and efficient constraint propagation for these variables. Thus, it may be required to represent string domains in a manner that enables efficient performance of required operators. String domain representation should preferably support set operations such as join, intersect, remove, get cardinality, get random element, or the like. Additionally, string domains should preferably support some additional specific string-related operators, such as concatenation, get/set sub string, get length, or the like.

Some known representations for string domains include a tuple, i.e., an enumeration of all possible values. This representation is not suitable for variables having large domains, and cannot represent a domain having infinite size.

Another representation is a fixed length array of character variables, however the expressiveness of such representation is limited. An extension of the later representation is a fixed length array with a "padding" character, thus providing a suitable representation or all strings with a length up to a given bound. However, the expressiveness of such representation is still limited.

Yet another representation of string domains utilizes regular languages, often expressed as regular expressions. A regular expression can be described by an automaton and is closed under set operations. A finite state automaton M may be defined as a 5-tuple, $(Q, \Sigma, \delta, q0, F)$, consisting of:

a finite set of states (Q)
a finite set of input symbols called the alphabet ($\Sigma$)
a transition function ($\delta: Q \times \Sigma \rightarrow Q$)
an initial or starting state ($q_0 \in Q$)
a set of accepting states ($F \subseteq Q$)

Some techniques use Non-deterministic Finite Automatons (NFA) for representing string variables. NFAs may comprise epsilon-transitions, i.e., transitions without a character, or a node having multiple outgoing edges having the same transition character. However, while the NFA representation preserves expressiveness and allows for efficient concatenation and join operations, it may prove non-scalable and inefficient for other operations such as determining the set of lengths of all strings in a given domain, or checking containment between two domains.

Other techniques express string domains by a Deterministic Finite Automaton (DFA) comprising nodes and edges, wherein each edge between two nodes in the DFA is associated with one or more characters. The DFA comprises a starting state, and one or more accepting nodes, such that each value for a domain represented by the relevant DFA may be described as a path in the DFA, which starts at the initial node, advances along the edges as characters are added, and ends in one of the accepting nodes. The DFA by definition does not contain epsilon transition, nor multiple outgoing edges from the same node associated with the same character.

One technical solution of the disclosed subject matter relates to expressing string domains by a Deterministic Finite Automaton (DFA) which contains no back loops of size larger than one, i.e., the only allowed loops are self loops in which the source and the destination are the same node.

Limiting the automaton to a deterministic automaton without loops other than self loops enables the CSP solvers to express any number of words of any length, and perform all required operators, while maintaining a DFA representation. By avoiding loops of two or more edges, the DFA may comprise fewer edges than non-limited DFAs, thus providing for more time and memory efficient algorithms Additionally or alternatively, avoiding loops other than self loops saves the need to track for each node which loops it participates in, which also facilitates the algorithms, as detailed below. The effect of the limited loops, and of the automaton being a deterministic automaton without epsilon transitions is detailed below in association with the description of exemplary implementations of set operations and string operations, which are shown to be relatively efficient implementations.

Referring now to FIG. 1, showing a flowchart of a method for using a DFA representation for solving a CSP, in accordance with some embodiments of the disclosure.

At step 104, a string variable is to be defined, using a string domain data structure, representing a string domain. The string domain data structure is implemented as, or comprises a DFA with no back loops having size larger than one.

At step 108, additional variables may be defined, comprising any type of variable, such as integers, real numbers, characters, additional string variables, complex types, or the like.

At step 112, one or more constraints, at least one of which involving the string variable, may be defined. The combination of the variables, their respective domains, and constraints defines a CSP to be solved.

At step 116, the CSP described by the variables defined on steps 104 and 108, and the constraints defined on step 112 may be solved, for example by a CSP solver adapted to use string variable domains implemented as DFAs with no back loops having size larger than one. The CSP solver may be configured to perform value propagation into the domain of string values, thus reducing the size of the string domain, based on the constraints and the value selection made by the CSP solver. The CSP solver may be configured to perform a value selection from the domain of string values, wherein the value selection reduces the domain to one or more values. Unlike domain propagation, value removal during selection may be undone by backtracking.

At step 120, the results obtained by the CSP solver may be transmitted to a user or another system, notified to a user or a system, or used in any other manner.

Figure 2:
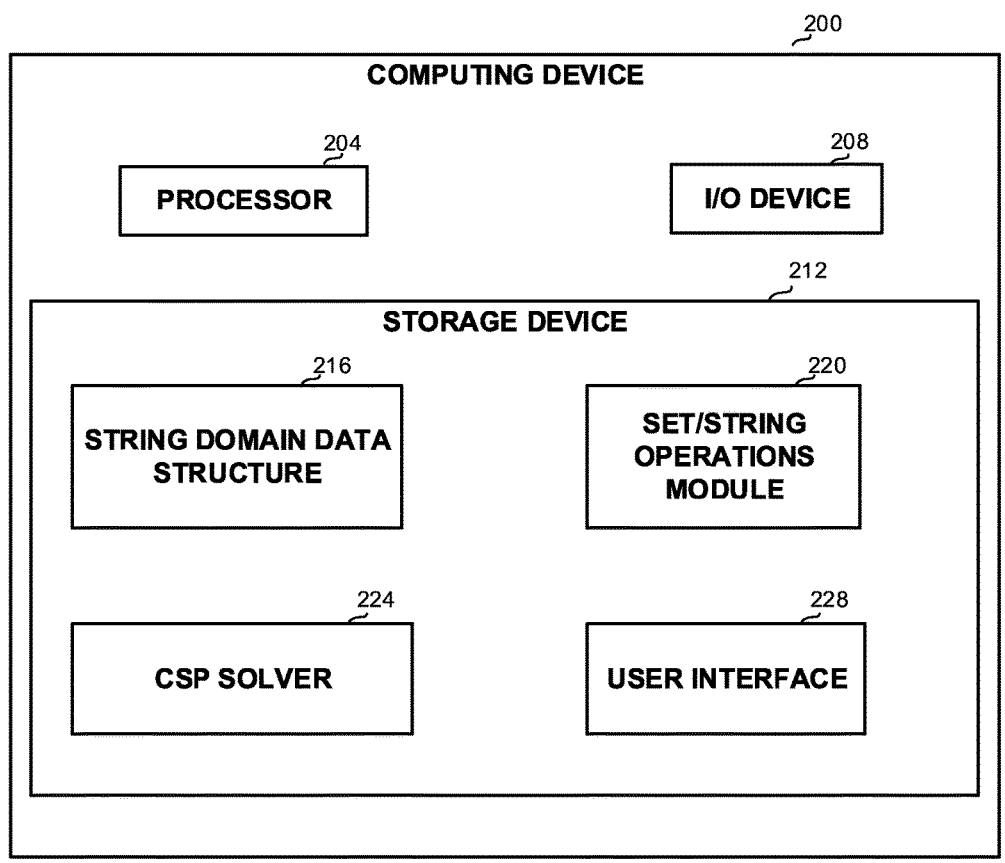
FIG. 2 is a block diagram of an apparatus for solving CSPs, in accordance with some embodiments of the disclosure.

Referring now to FIG. 2, showing a block diagram of an apparatus for solving CSPs, in accordance with some embodiments of the disclosure.

The apparatus may comprise computing device 200, which may comprise one or more processors 204. Any of processors 204 may be a Central Processing Unit (CPU), a microprocessor, an electronic circuit, an Integrated Circuit (IC) or the like. Alternatively, computing device 200 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processors 204 may be utilized to perform computations required by comptuing device 200 or any of it subcomponents.

In some embodiments, computing device 200 may comprise an input-output (I/O) device 208 such as a terminal, a display, a keyboard, a mouse, a touch screen, or the like to interact with the system, for example to invoke the system or to receive results. It will however be appreciated that the system can operate without human operation and without I/O device 208.

Computing device 200 may comprise one or more storage devices 212 for storing executable components, and which may also contain data during execution of one or more components. Storage device 212 may be persistent or volatile. For example, storage device 212 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 212 may retain data structures and program code operative to cause any of processors 204 to perform acts associated with any of the steps shown in FIG. 1 above, for example solving CSPs.

The components detailed below may be implemented as one or more sets of interrelated computer instructions, executed for example by any of processors 204 or by another processor. The components may be arranged as one or more executable files, dynamic libraries, static libraries, methods, functions, services, or the like, programmed in any programming language and under any computing environment.

In some exemplary embodiments of the disclosed subject matter, storage device 212 may accommodate a string domain data structure 216. String domain data structure 216 may be used for defining a domain of string values for a string variable, wherein the string data structure represents the domain of string values as a Deterministic Finite Automaton (DFA). The DFA comprises nodes and edges, wherein the nodes comprise an initial node, one or more accepting nodes, and optionally some intermediate nodes, and each edge represents one or more characters. The DFA may not have back loops having size greater than 1. The domain of string values comprises all strings for which a path in the DFA, formed by characters associated with the edges of the path, exists beginning in the initial node and ending in one of the one or more accepting nodes. The data structure may be provided as a code, such as a class in an object-oriented programming language, a library of functions, as a textual header, as a binary implementation, or the like.

Storage device 212 may comprise a set/string operations module 220, implementing operations on string domains or variables, including operations applicable to any set, and operations specific for strings values or domains. The implementation of some exemplary operations is detailed below. Set/string operations module 220 may be provided as a source code to be compiled, as an executable, as a static or dynamic library, or the like.

Storage device 212 may comprise a CSP solver 224, adapted to solve constraint satisfaction problems with variables, wherein at least one of the variables is a string variable, which is represented using a String Domain Data Structure 216, and operations to be performed on the domain are provided by set/string operations module 220.

Storage device 212 may comprise user interface 228 for receiving input from a user, such as variables, domain definitions or constraints, and providing output to the user, such as solutions.

Figure 3:
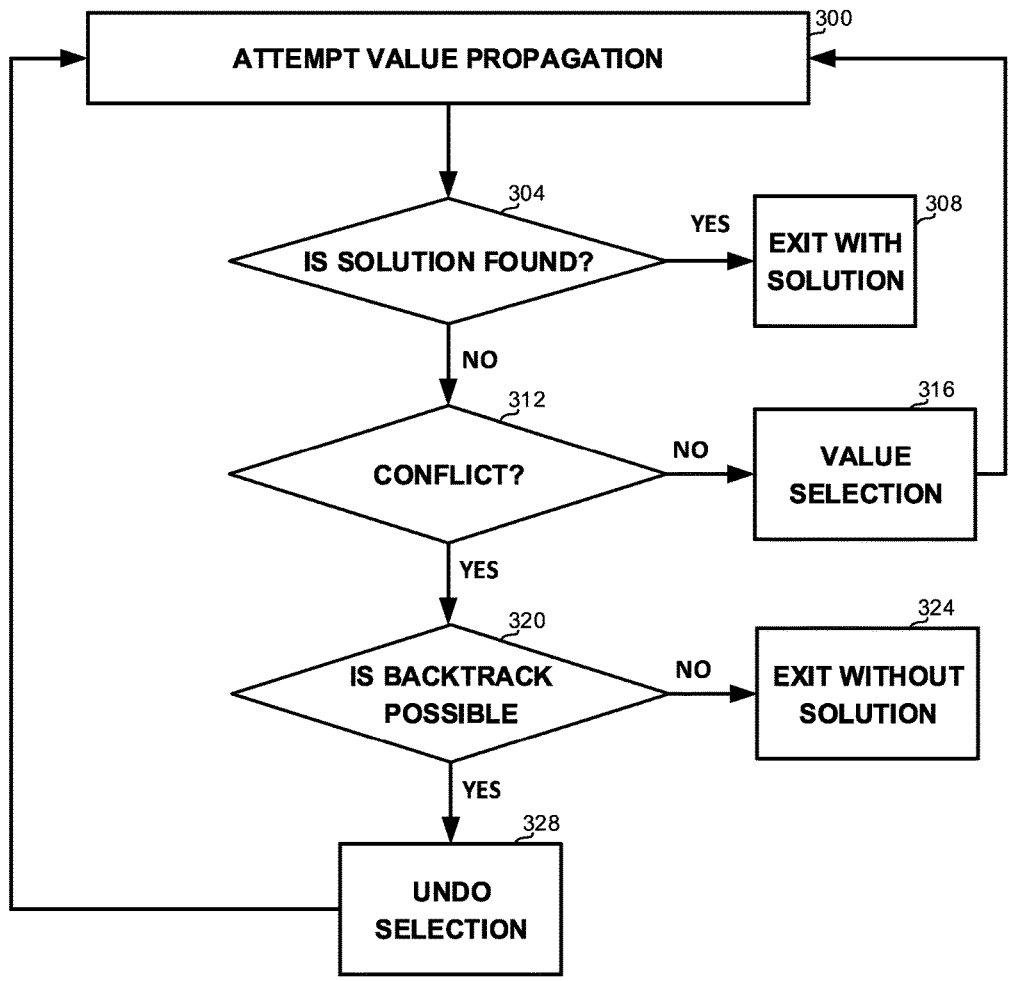
FIG. 3 shows a schematic flowchart of a method for solving a CSP, in accordance with some exemplary embodiments of the disclosed subject matter.

Referring now to FIG. 3, showing a schematic flowchart of a method for solving a CSP, in accordance with some exemplary embodiments of the disclosed subject matter.

At step 300, value propagation may be attempted. Value propagation relates to reducing the domain of one or more variables in accordance with the current domains of the other variables and the constraints. In some cases, the propagation may be employed in view of a selection made during the CSP solving process (316). Additionally or alternatively, the propagation may be performed initially prior to the first selection, based only on the initial variable domains and the constraints. For example, if it is required that a+b=5 where a and b are positive integers, and a is smaller than 2 then the domain of b can be reduced to integers larger than 3 and smaller than 5. In some cases one or more value propagation may be ineffective, in which case no domain will be reduced.

At step 304, it may be determined whether a solution has been found, i.e., whether values have been assigned to all variables, such that all the constraints are met. If a solution was found, then on step 308 the solver may exit with the solution. Otherwise, at step 312, it may be determined whether the values assigned so far represent a conflict. In the example above, if b is limited to numbers smaller than 3, then a conflict exists. In some cases, a conflict may be represented by a variable's domain being empty and therefore having no possible assignments.

If no conflict exists, then at step 316 a value may be selected for a variable that has not been assigned a value before, and execution may return to step 300.

If a conflict exists, then at step 320 it may be determined whether backtracking is possible, e.g., whether a selection can be undone.

If not, for example no selection has been made, all selections have been undone, or all values for a particular variable have already been tried or will represent a conflict as well, then at step 324 the solver may exit and provide an indication that no solution exists.

If backtracking is possible, then at step 328 one or more selections may be undone, and execution may return to step 300.

Thus a solver operating on accordance with the method will exit with a solution in which the constraints are met, or indicate that the problem is unsolvable.

It will be appreciated that the solver may also operate under a backtracking limit. In such case, if a solution was not found before the limit was reached, the solver may indicate that a solution has not been found.

Referring now to FIGS. 4A-4M, demonstrating algorithms for performing operations required by CSP solvers on sets or domains implemented as DFA without back loops having size larger than one. It will be appreciated that all manipulations on DFAs without back loops maintain this property, i.e., create or return a DFA with no back loops as well. For some operations, additional conditions on the DFA may apply as detailed below. However, if an automaton is returned by any of the operators, the automaton is deterministic and has no back loops of size greater than 1.

The operations include set operations which may be required for any set of values, regardless of how the elements in the set are represented. Set operations may include Join; Intersect; Remove and Complement which return a DFA without back loops. Set operators may further comprise Get Size; Get Random Element; Is Equal and obtaining an iteration element for iterating over the elements of the set one by one.

The operations may also include regular expression operations, which are applicable specifically to strings. Regular expression operations may include concatenating with another string (or string domain), repeating, and getting or setting a length of the string.

In FIGS. 4A-4M below, a starting state is marked as a smaller circle with no incoming edges except self loops, and an accepting state is indicated as a thick circle.

In the description below, the terms node and state are used interchangeably, and similarly for the terms edge and transition.

A state in the DFA may be implemented as a data structure comprising the members or fields detailed below:

A Boolean IsAccepting field, indicating whether the state is an accepting state, i.e., a state at which the automaton can stop with a value consisting of characters along the edges leading from the starting state to the accepting state; an integer Size field indicating the number of strings that can be expressed by the DFA having the current state as a starting state; an integer set Lengths field, containing a collection of all the lengths of strings that can be represented by the DFA having the current state as a starting state; an OutTransitions field indicating the edges going out from a state, which may be implemented as a sequence of pairs, each pair comprising a collection of one or more characters (transition keys), and a state reachable by any of the transition keys; and an InTransitions field indicating the edges coming into a state, which may be implemented as a collection of pairs, each pair comprising transition keys and states from which the current state can be reached by any of the transition keys. In some embodiments, the OutTransitions and InTransitions fields can be implemented as maps. In some embodiments, the OutTransitions or the InTransitions fields may be omitted. In some embodiments, the transition keys may be ordered.

In FIGS. 4A-4M below, it is assumed that the full set of keys, also referred to as the alphabet, consists of a, b, c and d.

Figure 4A:
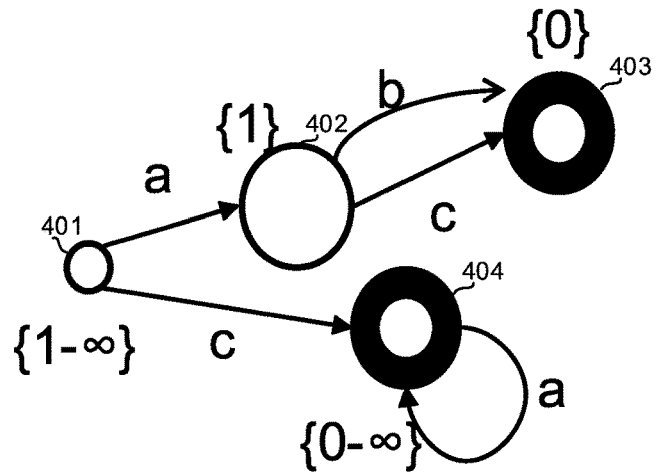
FIG. 4A is an exemplary illustration of a GetLength operation, in accordance with some exemplary embodiments of the disclosed subject matter.

Referring now to FIG. 4A, showing an exemplary illustration of the GetLength operation, of a DFA defining the regular expression of (ab)|(ac)|(ca*). The DFA comprises an initial node 401, having transitions of a and c to nodes 402 and 404, respectively. State 402 has transitions of b or c, both to accepting state 403. Node 404 is an accepting state having a self loop of an a transition. The GetLength operation returns the set of lengths of all strings represented by the automaton. The GetLength operation may be implemented for each state, as if it were the starting state of an automaton, as follows (thus, when applied to the starting state, it returns the set of lengths of all strings represented by the automaton):

If the state is accepting and has a loop, which must be a self loop, then the Lengths set is set to $\{0-\infty\}$, as shown for node 404, since a string of any length can be expressed by repeating any required number of times the character associated with the edge, or one of the characters in a multi-character loop edge. Otherwise, the Lengths set is initially set to an empty set. The Lengths set may then be set to a join of the results returned by the GetLength operator invoked recursively for all OutTransitions states, i.e., for all states reachable from the current state in a single step. Then, if the state has no self loops, a value of 1 is added to each of the members in the Lengths set. Otherwise, if the state has a self loop, the value of $(1-\infty)$ is added to each of the Lengths set members. For example, if the Lengths as determined upon the reachable states of a particular state is $\{3, 4\}$, it may become $\{4-\infty, 5-\infty\}$ which is actually $\{4-\infty\}$. If the state is an accepting state, then the value of 0 is inserted into the Lengths set. Thus the Lengths of node 403 is $\{0\}$ and the Lengths of node 402 is received by adding 1 to each member of the set $\{0\}$, thus obtaining $\{1\}$. The Lengths of node 401 is a join of $\{1\}$ and $\{0-\infty\}$ wherein 1 is added to each element, resulting in $\{1-\infty\}$.

If loops of size greater than one are allowed, the complexity of the Lengths set computation may increase significantly. If epsilon transitions are allowed, the Lengths operation would not change significantly, but the computations would be longer, as epsilon transitions do not contribute to the length and have to be treated differently from other transitions, therefore extra checks would have to take place, thus increasing the computation time.

In pseudo code the method may be described as follows:
For each state:

```
If (IsAccepting && HasLoop)
    Lengths={0-∞}
Else
    Lengths.SetEmpty
    Length = Join all target states.GetLengths
    If (!HasLoop)
        Lengths.Add(1)
    Else // (HasLoop)
        Lengths.Add(1-∞)
    If (IsAccepting)
        Length.Insert(0)
```

Figure 4B:
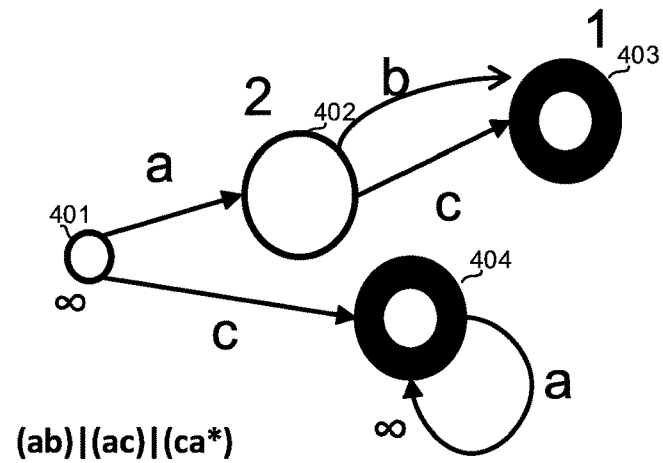
FIG. 4B is an exemplary illustration of a GetSize operation, in accordance with some exemplary embodiments of the disclosed subject matter.

Referring now to FIG. 4B, showing an exemplary illustration of the GetSize operation, for the same DFA as FIG. 4A, defining the regular expression of (ab)|(ac)|(ca*). GetSize indicates the number of different strings that can be expressed by the DFA, i.e., the size of the set of strings represented by the DFA. The operation may be implemented for each state (as if it were the starting state of the automaton) as follows (thus, when applied to the starting state, it returns the size of the set of strings represented by the automaton):

The size is initially set to 0. The size is then set to the sum of the sizes returned by recursive invocations of GetSize for all OutTransition states, as shown for node 402. If the state is accepting, the size is incremented by 1 as shown for node 403. If the state has (self) loop and its size is positive, the size is set to ∞, as shown for node 404 (after being incremented to one similarly to node 43) and hence to state 401 since (∞+a=∞ for any non-negative number a). The DFA being deterministic provides for simpler computations, since each string is associated with a unique path, otherwise a list of all strings representable by the automaton starting at the current state has to be maintained, and each string found from traversing this automaton has to be compared to the already found ones.

In pseudo code the method may be described as follows:
For each state:

```
Size = 0
Size = Sum for all keys OutTransitions[key].GetSize
If (IsAccepting)
    Size++
If (HasLoop && Size != 0)
    Size = ∞
```

Figure 4C:
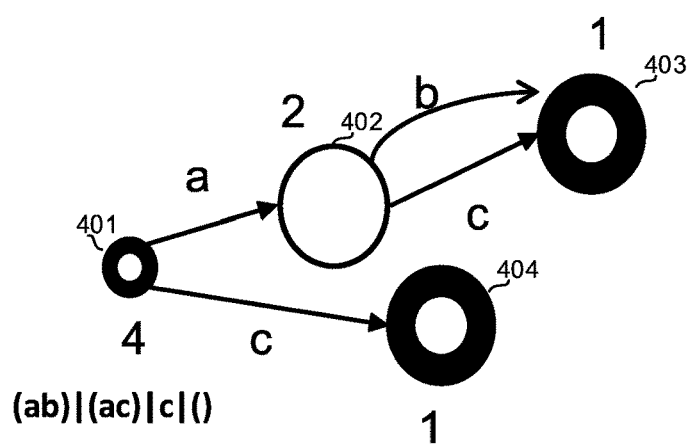
FIG. 4C is an exemplary illustration of a GetRandomElement operation, in accordance with some exemplary embodiments of the disclosed subject matter.

Referring now to FIG. 4C, showing an exemplary illustration of the GetRandomElement operation, for a DFA similar to the one of FIG. 4B, without the self loop of node 404, defining the regular expression of (ab)|(ac)|c|( ), wherein "( )" denotes empty string. GetRandomElement returns a random string, with a uniform distribution, from all strings that can be expressed by the DFA. It is noted that this algorithm is valid only for DFAs with no loops at all, otherwise an infinite number of strings exist, and a random selection cannot be made with uniform distribution.

The operation may be implemented by determining a random number x, between one and the DFA size, and searching for the $x^{th}$ element within an ordered collection of the strings representable by the DFA. Searching may be performed by checking for each OutTransition of the starting state whether its Size plus the accumulated sizes of the previous OutTransitions exceeds the random number. If it indeed exceeds, search continues within the DFA starting at the particular OutTransition's target, otherwise the next OutTransition is checked.

The DFA being deterministic provides for efficiency of the operator due to the path uniqueness of each string represented by the DFA. If the DFA contains loops, uniform distribution of the strings is not guaranteed, as detailed above, thus the random elements returned by the method may be biased.

In pseudo code the method may be described as follows:
Current=starting state
Element=" "
Get random number: x∈{1 . . . current.GetSize( )}
Weight=0
(*) For every key from the OutTransitions of Current state:

```
targetState = OutTransition[key]
If (x ≤ Weight + targetState.GetSize)
    Element.push_back(key)
    Current = targetState
    Start over from (*) for the new Current
else
    Weight += targetState.GetSize
Return element
```

In the example of FIG. 4C, the DFA represents four strings: ab, ac, c, and the empty string. The Size of each node is shown next to the node. If the random number is 1, the returned string would be the string associated with node 403 as reached through the edge marked with 'b', i.e., "ab", for a random number of 2 the string would be "ac", for a random number of 3 the sting would be "c", and for a random number of 4 the returned string would be the empty string.

Figure 4D:
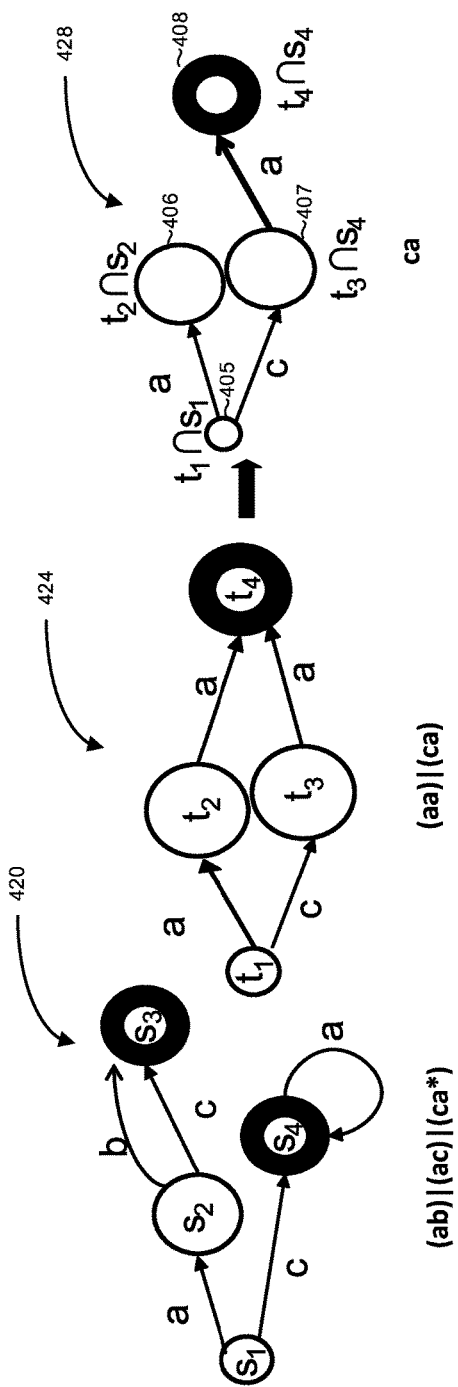
FIG. 4D is an exemplary illustration of an Intersect operation, in accordance with some exemplary embodiments of the disclosed subject matter.

Referring now to FIG. 4D, showing an exemplary illustration of the Intersect operation, receiving two DFAs and determining a DFA representing the set of strings that can be represented by both of the given DFAs. FIG. 4D shows a first DFA 420 identical to the DFA of FIG. 4A whose nodes are indicated by $S_i$ wherein i is between 1 and 4, representing the regular expression (ab)|(ac)|(ca*), and a second DFA 424 representing the regular expression (aa)|(ca) whose nodes are indicated by $t_j$ wherein j is also between 1 and 4. The operation may be implemented as follows:

A resulting DFA 428 is constructed, in which a new state is defined as an intersection of the two starting states, as shown for node 405, $t_1 \cap s_1$. The new state is set to be accepting if both starting states are accepting, thus node 405 is not an accepting state. The method then continues recursively for all transitions having the same key in both states. Therefore, since both $s_1$ and $t_1$ have a and c transitions, node 405 also has these two transitions, leading to nodes 406 ($t_2 \cap s_2$) and 407 ($t_3 \cap s_4$), respectively. Then node $s_2$ has b and c transitions and node $t_2$ has only a transition, thus there is no OutTransition of node 406. Node 407, however, has an OutTransition on key a since both $t_3$ and $s_4$ have such transition, leading to new node 408 ($t_4 \cap s_4$), which is also set to be an accepting node, since both $t_4$ and $s_4$ are accepting nodes. The resulting regular expression of the intersection DFA is thus ca.

In order to improve performance, as well as to avoid infinite loops of the algorithm, a list of already intersected state pairs may be maintained, and a pair that has already been handled is not processed again. When the output DFA is complete, the Size and Lengths fields may be calculated for each node as detailed in association with FIGS. 4A and 4B above.

The DFA being deterministic provides for efficiency of the operator since otherwise the time and memory requirements may grow exponentially, as it may be required to produce intersections of more than a pair of states, and perform lookahead for epsilon transitions. If the DFA contained loops of size exceeding 1, it would be required to keep the history and note how every node has been arrived to, which may greatly increase the computation time.

In pseudo code the method may be described as follows:

```
intersect(starting state of first DFA, starting state of second DFA)
where intersect(state1 of first DFA, state2 of second DFA) {
    create newState
    newState.IsAccepting = state1.IsAccepting && state2.IsAccepting
    newState.OutTransitions map contains only keys appearing in
    both state1
    and state2 OutTransitions maps.
    newState.OutTransitions[key]=Intersect(state1.OutTransition[key],
        state2.OutTransitions [key]
    return newState }
```

Figure 4E:
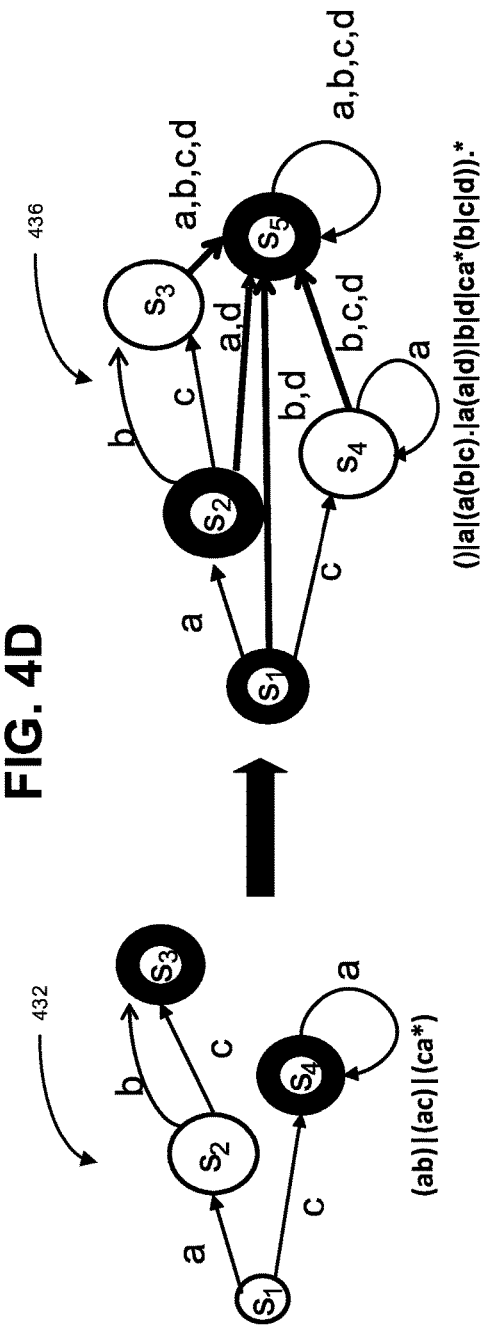
FIG. 4E is an exemplary illustration of a Complement operation, in accordance with some exemplary embodiments of the disclosed subject matter.

Referring now to FIG. 4E, showing an exemplary implementation of the Complement operation, for receiving a first DFA 432 and determining a second DFA 436 that can represent all strings which are not represented by the first DFA. FIG. 4D shows a first DFA 432 identical to the DFA of FIG. 4A whose nodes are indicated by $s_i$ wherein i is between 1 and 4, representing the regular expression (ab)|(ac)|(ca*). The operation may be implemented as follows:

A resulting DFA 436 is defined comprising the nodes and edges of DFA 432. An additional non-accepting state is added to the existing states, such as node $s_5$.

For each state, including the new state, its IsAccepting status is negated, thus changing states $s_1$, $s_2$ and $s_5$ into accepting states, and changing states $s_3$ and $s_4$ into non-accepting states. Then, transitions are added from all existing states to the new state, wherein the transitions have all keys from the alphabet not initially appearing in the OutTransitions of the respective state. Thus, since s1 has initially has OutTransitions for a and c, an edge having keys b or d is added between $s_1$ and $s_5$, an edge having keys a or d is added between s2 and s5, an edge having keys b, c or d is added between $s_4$ and $s_5$, and an edge having keys a, b, c or d is added between $s_3$ and $s_5$. Similarly, a self loop is added on s5, having keys a, b, c or d. The resulting regular expression is ( )|a|(a(b|c).|a(a|d)|b|d|ca*(b|c|d)).*

In pseudo code the method may be described as follows:
Add to the states list a new (non-accepting) state
For each state:
Negate its original IsAccepting status
add transitions to the new state with all keys from the alphabet not appearing in its original OutTransitions map.

It will be appreciated that the Complement method may be used for implementing a Remove method, such that removing the set of strings represented by a first DFA from the set of strings represented by a second DFA is performed by intersecting the second DFA with a complement of the first DFA. The resulting DFA represents all the strings which can be represented by the second DFA, but not by the first DFA.

Figure 4F:
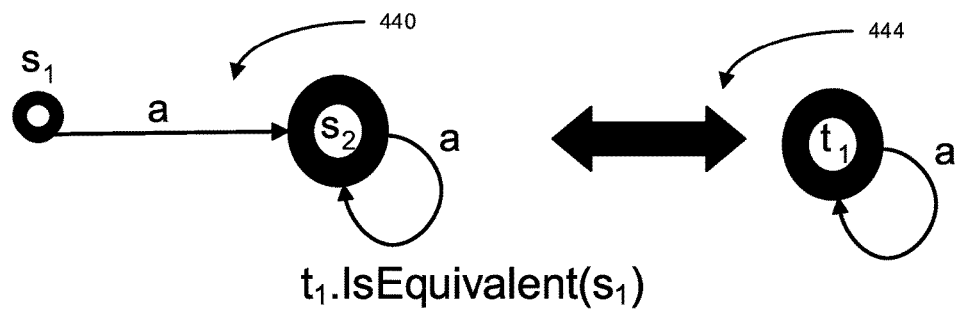
FIG. 4F is an exemplary illustration of an IsEquivalent operation, in accordance with some exemplary embodiments of the disclosed subject matter.

Referring now to FIG. 4F, showing an exemplary implementation of the IsEquivalent operation, for receiving a first state and a second state, and determining whether the states are equivalent, which is if and only if the sets of strings expressed by DFAs starting at the two states are equal. The operation may be implemented as follows:

State1 is equivalent to state2 if and only if all the following conditions are met: 1. State1 and state2 have the same IsAccepting status. 2. All keys in OutTransitions map of state1 are equal to all keys in OutTransitions map of state2. 3. For each such key, either state1 and state2 have a self loop on that key, or the state reached from of state1 with the key is equivalent to the state reached from state2 with the key.

In order to improve performance, as well as to avoid infinite loops of the algorithm, a list of already compared state pairs, together with the comparison results may be maintained, such that prior to comparing a pair of states, the list is checked and if the states have been previously compared the comparison is avoided.

In FIG. 4F, $s_1$ and $t_1$ are both accepting states; both have only an OutTransition on 'a'; and the respective reached states, being $s_2$ and $t_1$ are equivalent since they are both accepting states, have only a OutTransition, which is a self loop for both. Thus, $s_1$ and $t_1$ are equivalent.

Since the operator is recursive, having loops of size exceeding 1 would make the operator more complex, as it may be required to note for each state whether it is in a loop or not, and the behavior needs to be different for each case.

In pseudo code the method may be described as follows:
state1.IsEquivalent(state2) if and only if:
state1.IsAccepting==state2.IsAceepting;
All keys in OutTransitions map of state1 are equal to all keys in OutTransitions map of state2; AND
For every key:
Both states loop on this key OR
State1.OutTransition[key] is equivalent to State2.OutTransition[key]

It will be appreciated that two DFAs may be compared and may be determined to be equal (i.e., represent the same set of strings) if the starting state of the first DFA is equivalent to the starting state of the second DFA.

The Reduce and GetIterator operators disclosed below may be regarded as operators internal to the DFA.

Figure 4G:
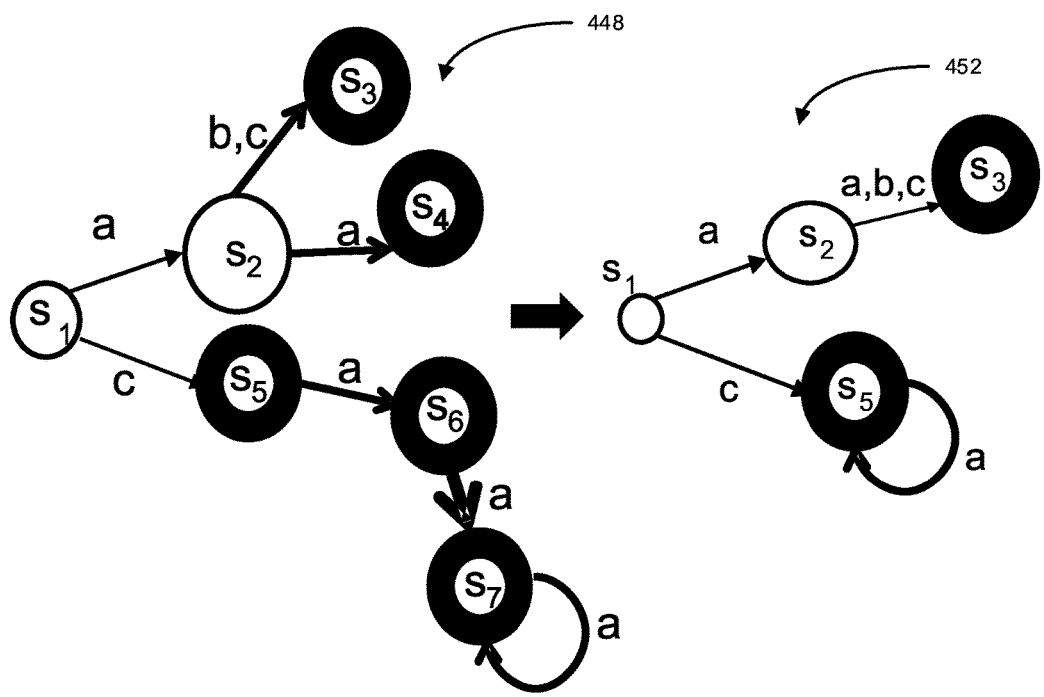
FIG. 4G is an exemplary illustration of a Remove set from another set operation, in accordance with some exemplary embodiments of the disclosed subject matter.

Referring now to FIG. 4G, showing an exemplary implementation of the Reduce operation, for receiving a DFA such as DFA 448, and determining the minimal equivalent form 452 of the DFA (in terms of states number). It will be noted that every DFA has a unique minimal form.

In order to determine the minimal form of a DFA, the following steps may be performed: Unreachable states, i.e., states without incoming edges, and dead-end states, i.e. non-accepting states with no outgoing edges are removed. Equivalent states may then be identified and combined, for example as described in "Minimization of Acyclic DFAs, pp. 132-146, Proceedings of PSC 2011" by Johannes Bubenzer published on 2011 incorporated herein by reference in its entirety for all purposes.

If the DFA contains loops of size exceeding 1, the identification of equivalent states is more complex and requires more time and memory resources.

In pseudo code the method may be described as follows:
Remove unreachable states;
Remove dead-end states;

Minimize number of states by combining equivalent states.

In the example of FIG. 4G, s3 and s4 of DFA 448 are equivalent and thus combined, and similarly for s5 and s6, and s6 and s7, producing DFA 452.

Figure 4H:
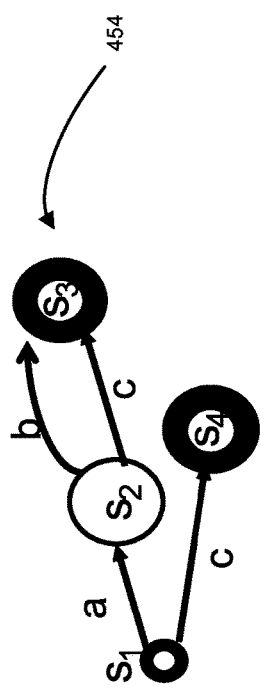
FIG. 4H is an exemplary illustration of getting an iterator over a DFA, in accordance with some exemplary embodiments of the disclosed subject matter.

Referring now to FIG. 4H showing an exemplary implementation of the GetIterator operator, for obtaining an iterator that iterates through the strings expressible by a DFA, such as DFA 454.

Implementation of the GetIterator may be performed only for enumerated DFAs, i.e., DFAs having no loops. Since loops enable an infinite number of string values, the strings cannot be enumerated. GetIterator may be performed as follows: a step is defined as a tuple comprising a state, a key, and a target state, and a path may be defined as a queue of steps. The first step is defining a tuple comprising the starting step, no key and the starting state. The operator then advances over the DFA in a Depth First Search (DFS) manner, and a path is returned for each such advancement. Thus in the example in FIG. 4H, the paths will be returned in the following order: s1, s1(a)s2, s1(a)s2(b)s3, s1(a)s2(c) s3, s1(c)s4.

In order to iterate over the strings expressed by the DFA, an iterator may be obtained. Then for each string the iterator may be advanced until an accepting state is reached, i.e., the path ends in a step that has an accepting state as the target state. Thus, in the example in FIG. 4H, since only s1, s3 and s4 are accepting, the returned strings will be the empty string for the first path, "ab", "ac" and "c" for the 3rd, 4th and 5th paths respectively.

In a non-deterministic automaton, the obtained order of the strings using this operation may not be lexicograhic. For example, if a state has two 'a' OutTransitions, and their respective targets have 'b', 'd' and 'c' OutTransitions respectively, then without a lookahead capability, the algorithm may produce the strings 'ab', followed by 'ad', and followed by 'ac'.

In pseudo code the method for building the paths may be described as follows:

```
Define step as <*state, key, *target>
Define path as Deque<step>
The first step is <starting state, NO_KEY, startingState>
Advancing the operator:
    If (path.back( ).target.OutTransitions not empty)
        path.push_back(target, target.OutTransitions.begin)
    Else
        While(path not empty)
            If (path.back( ).state.GetNextKey( ))
                return
            Else
                path.pop_back( )
```

Figure 4I:
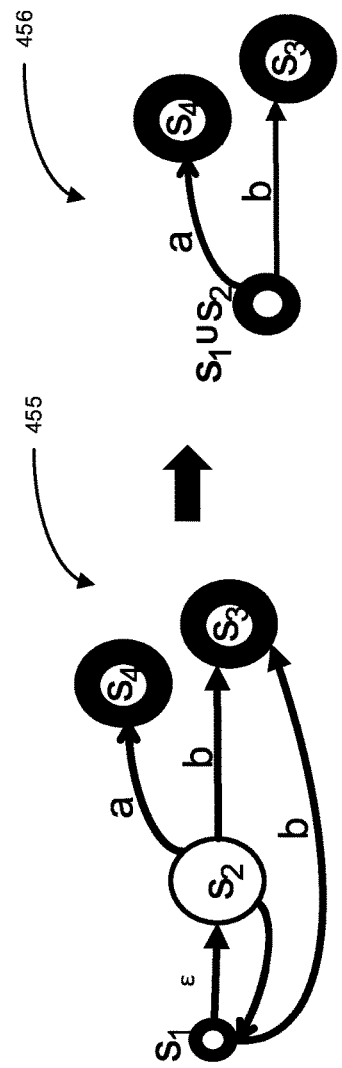
FIG. 4I is an exemplary illustration of eliminating epsilon transitions, in accordance with some exemplary embodiments of the disclosed subject matter.
Figure 4J:
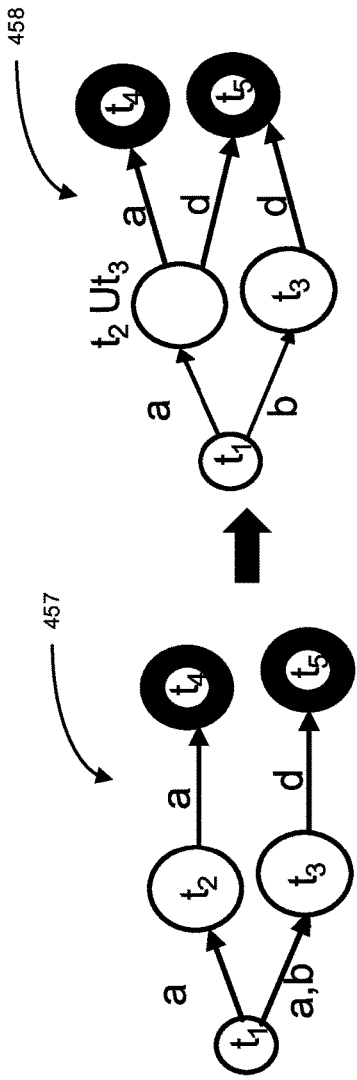
FIG. 4J is an exemplary illustration of transforming a Non-deterministic Finite Automaton (NFA) with no epsilon transitions into a DFA, in accordance with some exemplary embodiments of the disclosed subject matter.

Reference is now made to FIGS. 4I and 4J. Some operators, such as Join, Concatenation, Star and Repeat may create Non-deterministic Finite Automatons (NFAs) as part of their execution. An NFA differs from a DFA by having two or more OutTransitions from one state, the two OutTransitions having the same key. Other NFAs comprise one or more epsilon transitions, i.e., transitions not associated with any key. In order to transform an NFA into a DFA, such that the result of the operator remains a DFA, one or more of the following operations may take place.

Eliminating epsilon transitions: this may be performed by adding the OutTransitions of the target node of the epsilon transition to the OutTransitions of the source node of the epsilon transition. This operation is illustrated in FIG. 4I, in which the epsilon transition is eliminated by omitting s2, and connecting $s_4$ and $s_3$ directly to $s_1$, thus transforming NFA 455 to NFA 456, which comprises two OutTransitions from $S_1US_2$ having the same transition key a.

Transforming an NFA without epsilon transitions into an equivalent DFA may be performed by an operator of MakeDeterministic implemented as follows: recursively iterating over the states, using Breadth First Search (BFS), starting from the starting state. For each key that appears on multiple OutTransitions of a state: creating a new state, which behaves as the union of all the key's target states, which may include non-deterministic transitions. This means that the new state is accepting if at least one of the key's target states is accepting, and its outTransitions are a union of all outTransitions of the key's target states. This new state is made the single target for this key, i.e., an edge from the current state to the new state is added with this key, and the key is removed from all original outTransitions of the state. The Size and Lengths fields may then be recalculated for each state. This operation is illustrated in FIG. 4J, in which non-determinism in a transitions from state $t_1$ is eliminated, by adding an OutTransition with the a key to a new node unifying $t_2$ and $t_3$, thus transforming NFA 457 to DFA 458.

Thus, in order to transform any NFA into a DFA, first the epsilon transitions may be removed, followed by activation of the MakeDeterministic operator.

Figure 4K:
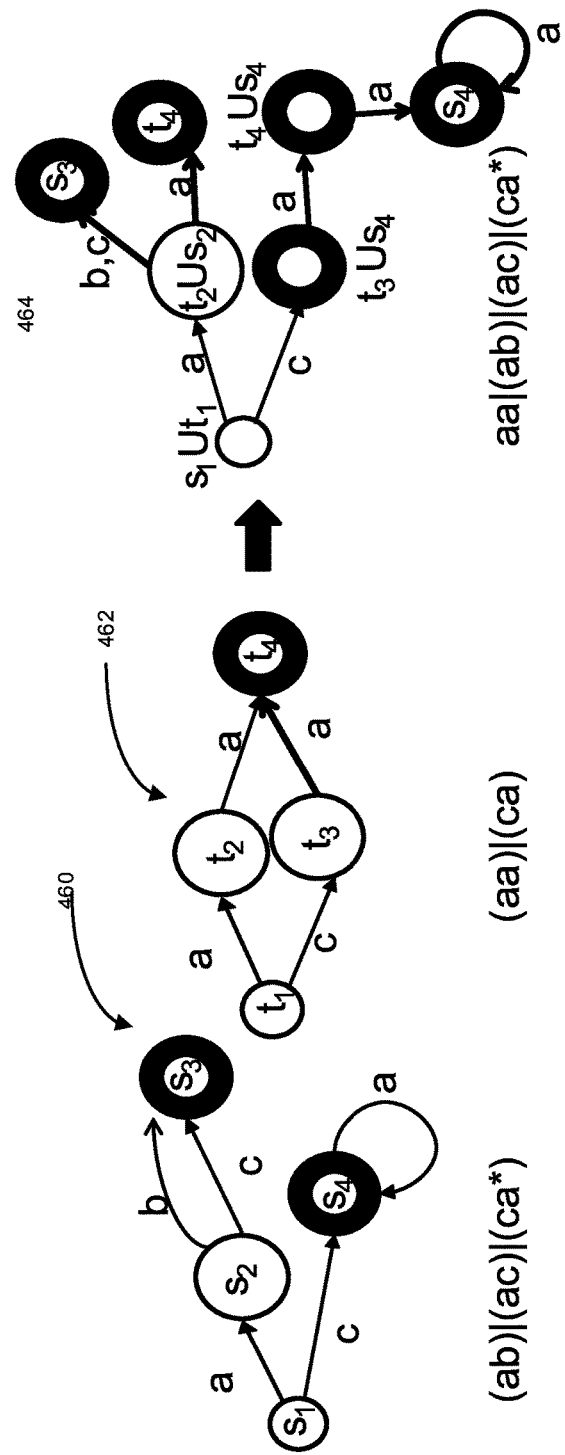
FIG. 4k is an exemplary illustration of a Join operation, in accordance with some exemplary embodiments of the disclosed subject matter.

Referring now to FIG. 4K, showing an exemplary implementation of the Join operation, for receiving a first DFA such as DFA 460, and a second DFA such as DFA 462 and determining a new (joined) DFA 464, which can represent all strings that can be represented by either input DFA.

In order to determine the joined DFA, the following steps may be performed: creating a new starting state; adding epsilon transitions from the new starting state to each of the original starting states of the given DFAs, and making the resulting NFA deterministic by removing the epsilon transitions and employing the MakeDeterministic operation as described above.

In the example of FIG. 4K, a new starting state may be created, and epsilon transitions are created from the new state to $s_1$ and $t_1$. The epsilon transitions are then removed by unifying the outTransitions of $s_1$ and $t_1$ into the new state, referred to as $s_1Ut_1$. This removal creates two a transitions from this new state: one to $s_2$ and the other to $t_2$, and two c transitions from the new state: one to $s_4$ and the other to $t_3$. In accordance with the MakeDeterministic auxiliary operation, the target states of the two a transitions are unified into a $t_2Us_2$ node, and the target states of the two c transitions are unified into a $t_3Us_4$ node. The edges outgoing the $t_3Us_4$ node are then unified, too, into a $t_4Us_4$ node, from which an a transition exits to $s_4$, and the self a loop of $s_4$ is maintained. The $t_4Us_4$ and the $s_4$ nodes are equivalent and can be combined as explained above.

Since the Join operator uses the MakeDeterministic operator which is recursive and therefore depends on the DFA not containing loops of size greater than one, this characteristic of the DFA is significant for the Join operator as well.

In pseudo code the method may be described as follows:
Create a new starting state;
Add epsilon transitions from the new starting state to each of the old starting states; and
Call RemoveEpsilonTransitions
Call MakeDeterministic.

Figure 4L:
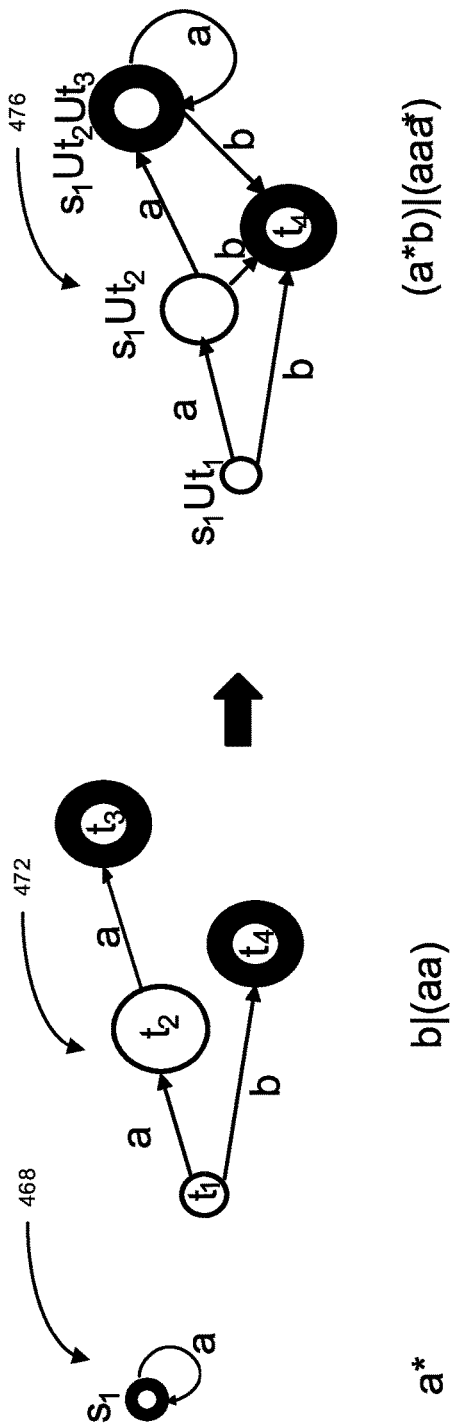
FIG. 4L is an exemplary illustration of a Concatenation operation, in accordance with some exemplary embodiments of the disclosed subject matter.

Referring now to FIG. 4L, showing an exemplary implementation of the Concatenation operation, for receiving a first DFA such as DFA 468 representing the regular expression a*, and a second DFA such as DFA 472 representing the regular expression b|(aa) and determining a DFA 476 representing their concatenation, meaning the regular expression (a*b)|(aaa*).

In order to determine the concatenation DFA, the following steps may be performed: an epsilon transition is added from each accepting state in the first DFA to the starting state of the second DFA. Then each accepting state in the first DFA is set to be non-accepting. The epsilon transitions may then be removed and the MakeDeterministic operator may be called as detailed above.

In the example of FIG. 4L, an epsilon transition is added from $s_1$ to $t_1$, and $s_1$ is set to be non-accepting. The epsilon transition is then removed and the DFA is made deterministic as described above.

In pseudo code the method may be described as follows:
For each accepting state in the first DFA:
Add an epsilon transition to the starting state of the second DFA.
SetAccepting(false);
Call RemoveEpsilonTransitions
Call MakeDeterministic It is noted that concatenation of a DFA of the form U* with a DFA of the form R*S, wherein U,R,S are sets of characters where |U|>1 and U∩S≠φ (for example concatenation (a|b)* with a) cannot be handled by this implementation of the concatenation operator since the output DFA may contain a loop of size larger than 1.

Figure 4M:
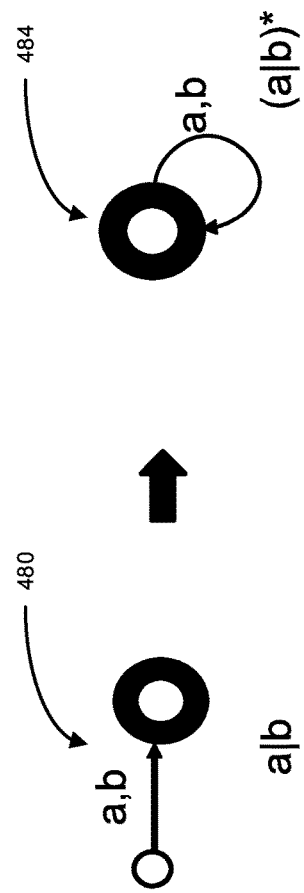
FIG. 4M is an exemplary illustration of a Star operation, in accordance with some exemplary embodiments of the disclosed subject matter.

Referring now to FIG. 4M showing an exemplary implementation of the (Kleene) Star operation, for receiving a first DFA such as DFA 480 and outputting a DFA representing zero or more repetitions of strings represented by the input DFA thus obtaining a DFA such as DFA 484.

In order to implement the Star operation, the following steps may be performed: adding an epsilon transition from each accepting state to the starting state, removing the epsilon transitions and unifying nodes as described above, followed by calling the MakeDeterministic function.

In pseudo code the method may be described as follows:
Add an epsilon transition from each accepting state to the starting state
Call RemoveEpsilonTransitions;
Call MakeDetermisnitic It is noted that the star operation is limited to input DFAs having lengths contained in the set of {0, 1}, otherwise the output DFA may contain a loop of size larger than 1.

If the automaton contained loops of size greater than 1, its size would not be contained in the {0,1} set, and thus this operator will be disabled.

It will be appreciated that the Star method, together with the Concatenation operator detailed above can be used to implement a Repeat operator for receiving a first DFA and a set of integers T and outputting a DFA representing T repetitions of strings represented by the input DFA. To this end, repeating concatenation for a required number of times, and using the star operation if the set T also includes infinity. For example, if the set T={3-5, 7-∞}, the original DFA will be concatenated with itself 7 times and then with its (Kleene) Star. In pseudo code the method may be described as follows:

```
num_concat = max(T) = ∞ ? min(last range in T) : max(T)
res=DFA of empty string
to_concat = input DFA
for t=1 to num_concat {
    if (t-1 in T)
        to_concat.starting state.SetAccepting(True)
    res = res.concat(to_concat)
}
If max(T) is ∞, res=res.concat(Star(input DFA))
Return res
```

It will be further appreciated that the Repeat operator may be used for implementing the SetLengths operation, i.e., narrowing the original set of strings to strings of a desired set of lengths T, by applying Intersect with the DFA created by (.).Repeat(T)), (.).Repeat(T) defines a DFA representing any character which repeats exactly t times for every t in T and intersecting the given DFA with such domain excludes any string not having exactly the required length therefrom.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for solving a Constraint Satisfaction Problem (CSP) having a constraint associated with at least one string variable, comprising:
    defining at least one string variable using a string domain data structure representing a domain of string values for string variables, wherein the string data structure represents the domain of string values as a Deterministic Finite Automaton (DFA), wherein the DFA comprising nodes and edges, wherein the nodes comprise an initial node and one or more accepting nodes, wherein the DFA has no back loops having size greater than 1, wherein the edges of the DFA represent one or more characters, wherein the domain of string values comprises each string for which a path in the DFA, according to characters in the edges of the path, exists beginning in the initial node and ending in one of the one or more accepting nodes;
    defining a constraint for the CSP, wherein the constraint involves the at least one variable and wherein the constraint is to be complied with by a solution to the CSP;
    invoking a CSP solver adapted to determine a solution to variables including the at least one string variable while complying with the constraint, and to invoke operations performed over the domain of the at least one string variable, wherein the CSP solver is configured to perform at least one of the following:
        value propagation into the domain of string values, wherein the value propagation reduces a size of the domain; and value selection of a value from the domain of string values, wherein the value selection reduces the domain, whereby value propagation to domains of one or more other variables is invoked by the CSP solver.

2. The method of claim 1, wherein the CSP solver performs operators on one or more of the DFA, wherein each of the operators returns a DFA comprising nodes and edges, wherein the nodes comprise an initial node and one or more accepting nodes, wherein the DFA has no back loops having size greater than 1, and wherein each of the edges represents one or more characters.

3. The method of claim 2 wherein the operators comprise set operators.

4. The method of claim 3 wherein the set operators comprise at least one operator selected from the group consisting of: a get set size operator; a remove set from another set operator; a get random element from a set operator; a join sets operator, an intersect sets operator; a complement set operator, and an is equal to a set operator.

5. The method of claim 2 wherein the operators comprise regular expression operators.

6. The method of claim 5 wherein the regular expression operators comprise at least one operator selected from the group consisting of: getting or setting a length of a regular expression operator; concatenating two regular expressions operator; and repeating a regular expression operator.

7. The method of claim 2 wherein the operators comprise internal operators.

8. The method of claim 2 wherein the operators comprise a reduce operator and a GetIterator operator.

9. The method of claim 1 wherein the value propagation is based on a value selection made by the CSP solver in an attempt to solve the CSP.

10. A computer program product comprising a non-transitory computer readable storage medium retaining program instructions configured to cause a processor to perform actions, which program instructions implement:
a string domain data structure for defining a domain of string values for a string variable, wherein the string data structure represents the domain of string values as a Deterministic Finite Automaton (DFA), wherein the DFA comprising nodes and edges, wherein the nodes comprise an initial node and one or more accepting nodes, wherein the DFA has no back loops having size greater than 1, wherein the edges of the DFA represent one or more characters, wherein the domain of string values comprises each string for which a path in the DFA, according to characters in the edges of the path, exists beginning in the initial node and ending in one of the one or more accepting nodes;
operations to be performed over one or more string variables defined in the domain of string values,
wherein the operations to be performed include operations useful for solving a Constraint Satisfaction Problem (CSP) which includes a constraint involving a string variable having the domain.

11. The computer program product of claim 10, further comprising a CSP solver adapted for solving the CSP which includes the constraint involving the string variable, wherein the CSP solver is configured to invoke the operations to reduce a size of the domain or to select a single value out of the domain.

12. The computer program product of claim 11, wherein the CSP solver performs operators on one or more of the DFA, wherein each of the operators returns a DFA comprising nodes and edges, wherein the nodes comprise an initial node and one or more accepting nodes, wherein the DFA has no back loops having size greater than 1, and wherein each of the edges represents one or more characters.

13. The computer program product of claim 12 wherein the operators comprise set operators.

14. The computer program product of claim 13 wherein the set operators comprise at least one operator selected from the group consisting of: a get set size operator; a remove set from another set operator; a get random element from a set operator; a join sets operator, an intersect sets operator; a complement set operator, and an is equal operator.

15. The computer program product of claim 10 wherein the regular expression operators comprise at least one operator selected from the group consisting of: getting or setting a length of a regular expression operator; concatenating two regular expressions operator; and repeating a regular expression operator.

16. The computer program product of claim 10 wherein the operators comprise internal operators.

17. The computer program product of claim 10 wherein the operators comprise a reduce operator and a GetIterator operator.

* * * * *